Oct. 13, 1970   H. P. HENDERSON   3,533,561
SPRINKLER HEAD
Filed Sept. 11, 1968
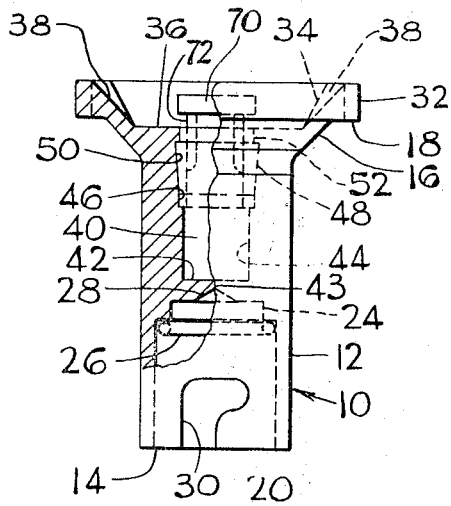
Fig. 1.
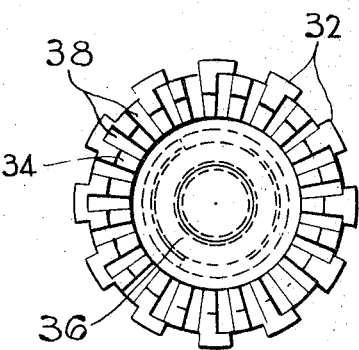
Fig. 2.
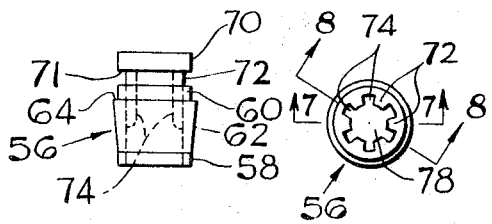
Fig. 3.   Fig. 4.   Fig. 6.   Fig. 5
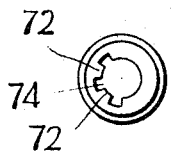
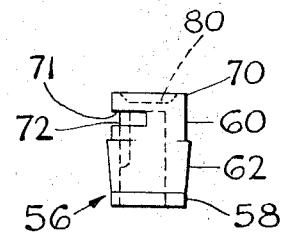
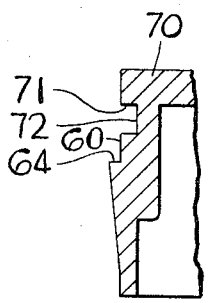
Fig. 7.
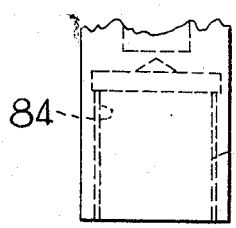
Fig. 10.
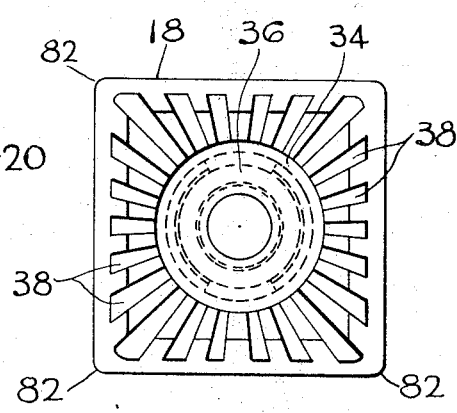
Fig. 9.
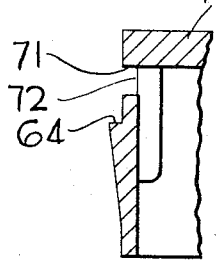
Fig. 8.
INVENTOR.
HAROLD P. HENDERSON
BY
*Christel & Bean*
ATTORNEYS

United States Patent Office 3,533,561
Patented Oct. 13, 1970

3,533,561
SPRINKLER HEAD
Harold P. Henderson, 272 Northwood Drive,
Kenmore, N.Y. 14223
Filed Sept. 11, 1968, Ser. No. 758,963
Int. Cl. B05b 1/14
U.S. Cl. 239—498          9 Claims

ABSTRACT OF THE DISCLOSURE

A sprinkler head, formed of plastic, having an inlet end provided with fastening means for engagement with a coupling means of a sprinkling system. The opposite end of the head has a plurality of discharge passages. A cavity is provided in the sprinkler head for receiving a plastic insert having fluted openings and a head formation for deflecting water toward the discharge passages. A wall separates the inlet end opening from the cavity and may be drilled prior to use to form a passage establishing communication between the inlet opening and the cavity.

BACKGROUND OF THE INVENTION

This invention relates to lawn or garden sprinkling systems and, more particularly, to a new and improved sprinkler head adapted to be attached to couplings of underground piping systems.

Generally, in sprinkling systems the sprinkler heads are spotted about a lawn or garden and are attached by pipe threads to nipples which extend from the underground piping system upwardly to the ground surface. The sprinkler heads are attached to the nipples at the ground surface and extend upwardly beyond the ground surface and are conventionally formed of metal. It can be readily appreciated that earth or lawn conditioning equipment, such as tractors, mowers, seed and fertilizer spreaders, etc. moving over a ground surface provided with such a sprinkler system may damage the sprinkler heads and/or the equipment contacting such heads.

SUMMARY OF THE INVENTION

The apparatus of the present invention, as hereinafter described, provides a solution to the above problems by providing a novel, yieldable, plastic sprinkler head, which is simple and rugged in construction, low in cost, durable in use and does not present rigid obstructions in the path of moving equipment.

Generally speaking, the sprinkler head of the present invention comprises a plastic body having a bayonet fitting at the inlet end adapted to be connected to a bayonet type coupling means of a sprinkling system and an outlet end provided with grooves for dispersing water in the form of a spray onto the surrounding ground surface. The body has a cavity for receiving a plastic insert having fluted openings and a head formation. A partition separates the inlet opening from the cavity. Prior to use the installer may drill a hole through the partition to establish communication between the inlet opening and the cavity, the diameter of the hole being dictated by available water pressure and the area to be covered by the sprinkler head.

BRIEF DESCRIPTION OF THE DRAWING

FIG. 1 is an elevational view, partially in section of one form of a sprinkler head constructed in accordance with the principles of this invention;

FIG. 2 is a top plan view of the sprinkler head of FIG. 1;

FIG. 3 is an elevational view of one form of an insert incorporated in the sprinkler head of the present invention;

FIG. 4 is a bottom end view of the insert of FIG. 3;

FIG. 5 is an elevational view of a modified form of the insert incorporated in the sprinkler head of the present invention;

FIG. 6 is a bottom view of the insert of FIG. 5;

FIG. 7 is a fragmentary vertical sectional view taken along line 7—7 of FIG. 4;

FIG. 8 is a fragmentary vertical sectional view taken along line 8—8 of FIG. 4;

FIG. 9 is a top plan view of a modified form of the sprinkler head; and

FIG. 10 is a modified form of the means for fastening the sprinkler head onto a sprinkling system coupling means.

DESCRIPTION OF THE PREFERRED EMBODIMENTS

Referring to FIG. 1 of the drawing, a preferred embodiment of a sprinkler head, generally designated 10, constructed in accordance with the principles of this invention, is formed of a plastic material by a suitable molding operation and comprises a cylindrical body portion 12 with a bottom inlet end 14 and a top outlet end which is flared outwardly as at 16 and terminates in an annular flange 18. The terms top, bottom, upper, lower, upwardly, downwardly, and the like, as used herein, are applied only for convenience of description with reference to FIG. 1 and should not be taken as limiting the scope of this invention.

The inlet end 14 of body 12 is adapted to be connected to a coupling means of an underground piping sprinkling system (not shown). The bottom portion of body 12 is provided with an opening 20 defined by a cylindrical wall and terminating longitudinally at approximately the midpoint of head 10. An annular shoulder 24 projects radially inwardly at the upper end of opening 20 and serves as a seat for an O-ring seal 26 for providing sealing pressure between head 10 and its associated coupling.

It will be noted that the closed end of opening 20 has a central conically shaped portion 28 for a purpose hereinafter explained. In the preferred embodiment, a pair of diametrically opposed inverted L-shaped slots 30, forming a bayonet fitting, are provided in the lower end of the body 12 for engagement with a bayonet type fitting on a sprinkling system coupling (not shown) for facilitating rapid securement to and removal of the head 10 from the coupling. It will be appreciated that any necessary or desired number of slots 30 may be used and that they may take various forms or shapes compatible with the coupling means to which they are to be attached, within the purview of this invention.

The flange 18 has a plurality of knurled projections 32 about the periphery thereof for facilitating the handling and manual rotation of sprinkler head 10. A conical recess 34 is formed at the upper end of body 12 and has a bottom surface 36 extending below flange 18. A multiplicity of spaced grooves or passages 38 are formed in flange 18 about the periphery thereof and are inclined downwardly and inwardly from the upper surface of flange 18 to the bottom surface 36 of recess 34.

The upper portion of body 12 has a cavity 40 having a bottom surface 42 in close proximity to the apex of the conical portion 28 of opening 20 defining a radial wall partition 43 therebetween. The cavity 40 consists of a bore 44, a counterbore 46, and a counterbore 48 having an outwardly inclined wall 50 terminating in an annular flange 52 projecting radially inwardly from the wall of counterbore 48.

A tubular insert, generally designated 56 (FIG. 3), formed of a suitable plastic material, is received in cavity 40 and has reduced cylindrical end portions 58 and 60 and an intermediate frusto-conical portion 62, the portions 58 and 62 having outer surfaces complementary to the inner wall surfaces of counterbores 46 and 48. An annular shoulder 64 is formed by the transition between portion 62 and the reduced diameter portion 60 of insert 56.

A head formation 70, having a bottom surface 71, is connected to the cylindrical portion 60 of insert 56 by means of a plurality of ribs 72 disposed in a circular array about the insert 56. A plurality of fluted openings 74 are provided in insert 56 between the inwardly projecting ribs 72. In effect, the ribs 72 form a connection between head formation 70 and the body portion of insert 56 as shown in FIGS. 7 and 8.

In assembling the insert 56 into body 12, portion 62 will be compressed radially as it is inserted into cavity 40 until the insert is bottomed in bore 46 at which time portion 62 will expand radially due to its resiliency and snap into the assembled position with the shoulder 64 abutting against the flange 52 of body 12 as shown in FIG. 1.

Prior to use, the installer drills a hole through partition wall 43 to form passages of a diameter to suit local conditions dependent on water pressure and the rate of water flow desired. The sprinkler head 10 is then connected and secured onto a bayonet type fitting on the sprinkler coupling of a sprinkling system.

In operation, water under pressure in the underground piping system is admitted into opening 20, through the drilled hole in partition wall 43 and the fluted openings 74 of insert 56 into engagement with the underside of head formation 70 which deflects the water radially outwardly to grooves 38 and disperses the water in the form of a spray onto the surrounding ground surface.

A modified form of the insert 56 is shown in FIGS. 5 and 6 which is very similar to the insert described above with the exception that fluted openings 74 are provided for only half of the insert 56 for use on sprinkler heads which are to be installed along the edge of a plot and spray only to one side of the head. Slot 80 is provided in the head 70 of insert 56 for receiving a screw driver for facilitating the rotation of the insert 56 to direct the spray in the proper direction. The other structural features of the insert shown in FIGS. 3 and 4 are duplicated in the modified form of FIGS. 5 and 6 and the same reference characters are used to identify elements similar to those used in the preferred form.

FIG. 9 illustrates a modified form of the present invention in which the flange 18 is substantially square in plan having rounded corners 82. Similarly to the preferred form of FIG. 1, a multiplicity of grooves 38 are formed about the periphery of flange 18 and are inclined downwardly and inwardly from the upper surface of flange 18 to the peripheral bottom surface 36 of recess 34.

FIG. 10 shows a modified form of a fastening means for removably securing the sprinkler head 10 to a sprinkling system coupling wherein the opening 20 has internal threads 84 for engaging an externally threaded nipple or coupling means of the sprinkling system.

The present invention thus provides a novel and simple lightweight, inexpensive sprinkler head for attachment to a coupling means of a sprinkling system. The sprinkler head is formed of yieldable plastic to avoid damage to rigid sprinkler heads and/or expensive equipment as a result of contact with such rigid sprinkler heads.

Preferred embodiments of this invention having been hereinabove described and illustrated in the drawing, it is to be understood that numerous modifications thereof can be made without departing from the broad spirit and scope of this invention as defined in the appended claims.

What is claimed is:

1. A sprinkler head comprising an elongated body formed of plastic material having an outlet end and an inlet end, said outlet end having a radially outwardly extending flange with a plurality of discharge passages formed therein about the periphery thereof, an opening in said body communicating between said inlet end and said discharge passages, a medial enlargement in said opening, a plastic insert having a lower portion adapted for snap fit engagement in said engagement and having a plurality of circumferentially spaced openings extending longitudinally thereof, said insert having an upper end head formation and a circumferential series of spaced, generally vertical ribs extending between said lower portion and said head formation and providing fluid egress to said discharge passages.

2. A sprinkler head as defined in claim 1 wherein said head formation overlies said circumferentially spaced openings to deflect water therefrom radially outwardly to said discharge passages.

3. A sprinkler head as defined in claim 1 wherein said inlet end is provided with a bayonet type fitting for engagement with a bayonet type coupling means.

4. A sprinkler head as defined in claim 1 wherein said inlet end is internally threaded for engagement with an externally threaded coupling.

5. A sprinkler head as defined in claim 1 wherein said circumferentially spaced openings are arranged in a semicircular array.

6. A sprinkler head as defined in claim 5 wherein said head formation overlies said circumferentially spaced openings, said head formation having a slot for receiving a work tool.

7. A sprinkler head as defined in claim 1 wherein said flange is knurled at its peripheral edge.

8. A sprinkler head as defined in claim 1 wherein said discharge passages comprise radiating grooves formed in the upper surface of said flange.

9. A sprinkler head comprising an elongated body formed of plastic material having an outlet end and an inlet end, said outlet end having a radially outwardly extending flange with a plurality of discharge passages formed therein about the periphery thereof, a cavity in said body communicating with said discharge passages, a plastic insert having a lower portion adapted for snap fit engagement in said cavity and having a plurality of circumferentially spaced openings extending longitudinally thereof, said inlet end having an opening leading to said circumferentially spaced openings, a transverse wall between said inlet opening and said circumferentially spaced openings, said wall being adapted to be drilled to provide a communicating opening of a desired diameter.

References Cited

UNITED STATES PATENTS

| 1,181,145 | 5/1916 | Larson | 239—498 X |
| 3,081,949 | 3/1963 | Simmons | 239—498 X |
| 3,249,309 | 5/1966 | Blackhall | 239—498 X |
| 3,321,141 | 5/1967 | Gemeny | 239—498 X |
| 3,454,225 | 7/1969 | Hunter | 239—498 X |

M. HENSON WOOD, Jr., Primary Examiner

M. Y. MAR, Assistant Examiner

U.S. Cl. X.R.

239—499